United States Patent
Sivadas et al.

(10) Patent No.: US 12,174,313 B2
(45) Date of Patent: Dec. 24, 2024

(54) SYSTEM AND METHOD FOR EXTENDING RADAR DOPPLER RANGE

(71) Applicant: Steradian Semiconductors Private Limited, Bengaluru (IN)

(72) Inventors: Apu Sivadas, Bengaluru (IN); Gireesh Rajendran, Bengaluru (IN); Sai Gunaranjan Pelluri, Bengaluru (IN); Ankit Sharma, Bengaluru (IN)

( * ) Notice: Subject to any disclaimer, the term of this patent is extended or adjusted under 35 U.S.C. 154(b) by 101 days.

(21) Appl. No.: 17/694,697

(22) Filed: Mar. 15, 2022

(65) Prior Publication Data
US 2023/0204715 A1  Jun. 29, 2023

(30) Foreign Application Priority Data

Dec. 29, 2021  (IN) .............................. 202141061506

(51) Int. Cl.
*G01S 7/35*  (2006.01)
*G01S 13/58*  (2006.01)

(52) U.S. Cl.
CPC ............ *G01S 7/354* (2013.01); *G01S 13/584* (2013.01)

(58) Field of Classification Search
CPC ............................... G01S 7/354; G01S 13/584
See application file for complete search history.

(56) References Cited

U.S. PATENT DOCUMENTS

| | | | | |
|---|---|---|---|---|
| 4,817,618 | A  * | 4/1989 | DesJardins | .............. A61B 8/06 600/455 |
| 2007/0244669 | A1* | 10/2007 | Vogel | ................. H03M 1/0836 702/85 |
| 2018/0306888 | A1* | 10/2018 | Robinson | .................. G01S 3/46 |
| 2022/0099820 | A1* | 3/2022 | Hong | ................... G01S 13/584 |
| 2023/0176188 | A1* | 6/2023 | Emadi | .................. G01S 13/343 342/173 |

* cited by examiner

*Primary Examiner* — Ladimir Magloire
*Assistant Examiner* — Noah Yi Min Zhu

(57) ABSTRACT

According to an aspect, a method of determining Doppler in a radar system comprising receiving a set of chirps, sampling in time the set of chirps to generate a set of non-uniform samples with one sample per chirp that is non-uniform in time in each chirp across the set of chirps, generating a first Doppler frequency from the set of non-uniform samples, generating a set of non-aliased Doppler frequencies for the first Doppler frequencies from a corresponding set of hypothesis, determining a first set of angles of arrival for every non-aliased Doppler frequency in the a set of non-aliased Doppler frequencies and selecting a first non-aliased Doppler frequency in the set of non-aliased Doppler frequencies that corresponds to the first angle of arrival with a minimum error in the a set of angles of arrival.

5 Claims, 9 Drawing Sheets

SYSTEM AND METHOD FOR EXTENDING RADAR DOPPLER RANGE

BACKGROUND

Cross References to Related Applications

This application claims priority from Indian Patent application No.: 202141061506 filed on Dec. 29, 2021 which is incorporated herein in its entirety by reference.

TECHNICAL FIELD

Embodiments of the present disclosure relate generally to Radar and more specifically to a system and method for extending radar Doppler range.

RELATED ART

Radar systems are generally employed for object detection, tracking and terrain mapping. Radar systems are increasingly used in various automotive applications such as driver assistance, obstacle detection, avoidance, and navigation of drones/UAVs for example. As is well known, Radars can detect surrounding obstacles or objects and send the relevant information like distance, relative position, direction and velocity of the object(s) that are in motion or still to a controller/central processor (software or hardware) or to a decision making.

In a frequency modulated continuous wave (FMCW) radar system, the radar signal transmitted through antennas is in the form of a varying frequency signal of a fixed duration referred to as chirp. A definite number of chirps with a particular repetition rate are transmitted as is well known in the art. In that, received signal is processed to determine range and/or the velocity of the object(s). In some radar systems determination also includes estimating the angle of arrival (azimuth and elevation angle of the object being detected) of the signal (using more than one antennas) as is well known in the art.

Several conventional radar systems exhibit a number of disadvantages and compromises on the performance due to inherent technical limitation. Some of the limitations are discussed hereunder. FIG. 1A illustrates an example sequence of chirps transmitted (and ideally received) for determining the range and Doppler. In the FIG. 1A, each chirp 110A-K are shown repeating at interval Ts and varying between frequency F1 to F2 (referred to as chirp bandwidth (BW)) The FIG. 1B illustrates an example sampling of the received chirps. As shown there the N sample within each chirps are processed to determine the range and K samples (one from each chirp) over the set of K chirps are processed to determine the Doppler. As is well known, the distance resolution in the depicted scenario is equal to velocity of light (c) divided by the twice the chirp bandwidth (c/2*BW). The Maximum distance that may be measured is (N*distance resolution). Similarly, the K samples across the K chirps, provides K Doppler bins. The maximum or minimum doppler (frequency, $f_s/2$) that may be measured unambiguously is equal to + (wavelength of the chirp)/(4*Ts). For instance, when 79 GHz is the operating frequency with $T_s$=36 μs, Radar can report the vehicle speed in [−26.4 m/s,+26.4 m/s]. Therefore, measurement is ambiguous if the vehicle speed is not in [$-f_s/2$, $+f_s/2$].

This, relations limit the performance of the system as: an attempt to enhance the Doppler resolution by decreasing the Ts results in either increased slope or reduced BW. Flexibility to increase the slope is limited to the electronics and devices response characteristics on one hand and on the other hand, reduction in BW affects the range resolution and/or maximum distance. In other words, if the slope of the chirp is maintained, then the bandwidth (BW) used is required to be reduced by 2 for doubling the Doppler range. This leads to loss of range discrimination or resolution in radar. Radar will fail to distinguish targets which are closely separated in range as in a motorbike right behind a car. If the existing chirp arrangement is modified to double the $f_s$ by maintaining the slope as original, then the large BW and reduced timing to sweep the ramp segments stresses the PLL/modulator that generates this chirp. This arrangement reaches a road-block due to inherent settling limits.

One known technique for extension of Doppler range is depicted in FIG. 2. As shown there, two or more (210, 220, 230) Range-Doppler segments (set of chirps) are employed. Each segment comprises repetitive sequence of chirps. In each segment 210, 220, 230, the time period is set to be different ($T_{R1}$, $T_{R2}$, $T_{R3}$). Each segment 210, 220, 230 is sampled at different frequency. For example, the segment 210 is sampled at $f_{s1}$, segment 220 at $f_{s2}$ and segment 230 at $f_{s3}$. A detected Doppler will appear as $\varphi_1$, $\varphi_2$, $\varphi_3$ in each segment. The conventional system then searches some integers M, N, P (250) such that the true Doppler is same from all measurements. The Searching integer may be mathematically represented as $\varphi1+M.fs1=\varphi2+N.fs2=\varphi3+P.fs3$. Generally, this approach is similar to Chinese Remainder Theorem (CRT) since CRT was used to solve equations of these kinds. There are other similar techniques described more fully in the article titled "Radar target detection and Doppler ambiguity resolution" by Matthias Kronauge; Christoph Schroeder; Hermann Rohling, published in the 11-th INTERNATIONAL RADAR SYMPOSIUM, ISBN 978-9955-690-18-4 and article titled "X-Band FMCW Radar System with Variable Chirp Duration" by; Christoph Schroeder; Hermann Rohling, published in 2010 IEEE Radar Conference proceedings. These prior techniques suffers from increase in overall data size by a factor of 3 which sets a limit on the Radar refresh rate and cost of computing at least.

Another prior technique, more fully described in the US patent application publication number US2019/0346551A, teaches employing only one set of uniformly sampled in time stream of radar data. In that, one path of data processing extracts the range and Doppler with max unambiguous Doppler limited to wavelength/(4*Chirp time) and range resolution of speed of light/(2*Bandwidth). The Second path takes the same input data and split each chirp into M smaller segments for range processing. Subsequent Doppler processing is done after compensating for center frequency difference. The effective chirp time is lowered by a factor of M and thereby the max Doppler is increased by a factor of M. However, the teachings suffers as the chirp is split into multiple segments, the range resolution will degrade by the same factor. That is, if there are multiple objects with various Doppler values within the degraded range resolution window of the second path then it is not possible to form an unambiguous range-doppler association for all cases.

SUMMARY

According to an aspect, a method of determining Doppler in a radar system comprising receiving a set of chirps, sampling in time the set of chirps to generate a set of non-uniform samples with one sample per chirp that is non-uniform in time across the set of chirps, generating a first Doppler frequency from the set of non-uniform samples, generating a set of non-aliased Doppler frequencies for the first Doppler frequencies from a corresponding set of hypothesis, determining a first set of angles of arrival for every non-aliased Doppler frequency in the set of non-aliased Doppler frequencies and selecting a first non-aliased Doppler frequency in the set of non-aliased Doppler frequencies that corresponds to the first angle of arrival with a minimum error in the set of angles of arrivals.

According to another aspect, the set of non-uniform samples are sampled at time instances Ts+dt0, 2 Ts+dt1, 3 Ts+dt2, through KTs+dtk−1 when the set of chirps comprises K chirps with a uniform time period Ts and the set of non-aliased Doppler frequencies are fd1, fd2, . . . fdM, the first doppler frequency is fd and the set of hypothesis are fdm=fd+m*(1/Ts), where m taking integer value from −M to +M.

According to another aspect, the set of chirps comprises K chirps with a non-uniform time period Ts, Ts+dt0, Ts+dt1 . . . . Ts+dtk−2 and each chirp having a bandwidth BW and same slope . . .

Several aspects are described below, with reference to diagrams. It should be understood that numerous specific details, relationships, and methods are set forth to provide a full understanding of the present disclosure. One who skilled in the relevant art, however, will readily recognize that the present disclosure may be practiced without one or more of the specific details, or with other methods, etc. In other instances, well-known structures or operations are not shown in detail to avoid obscuring the features of the present disclosure.

FIG. SE illustrates spectrum as an example measure of error determined by the RDP.

Figure 6:
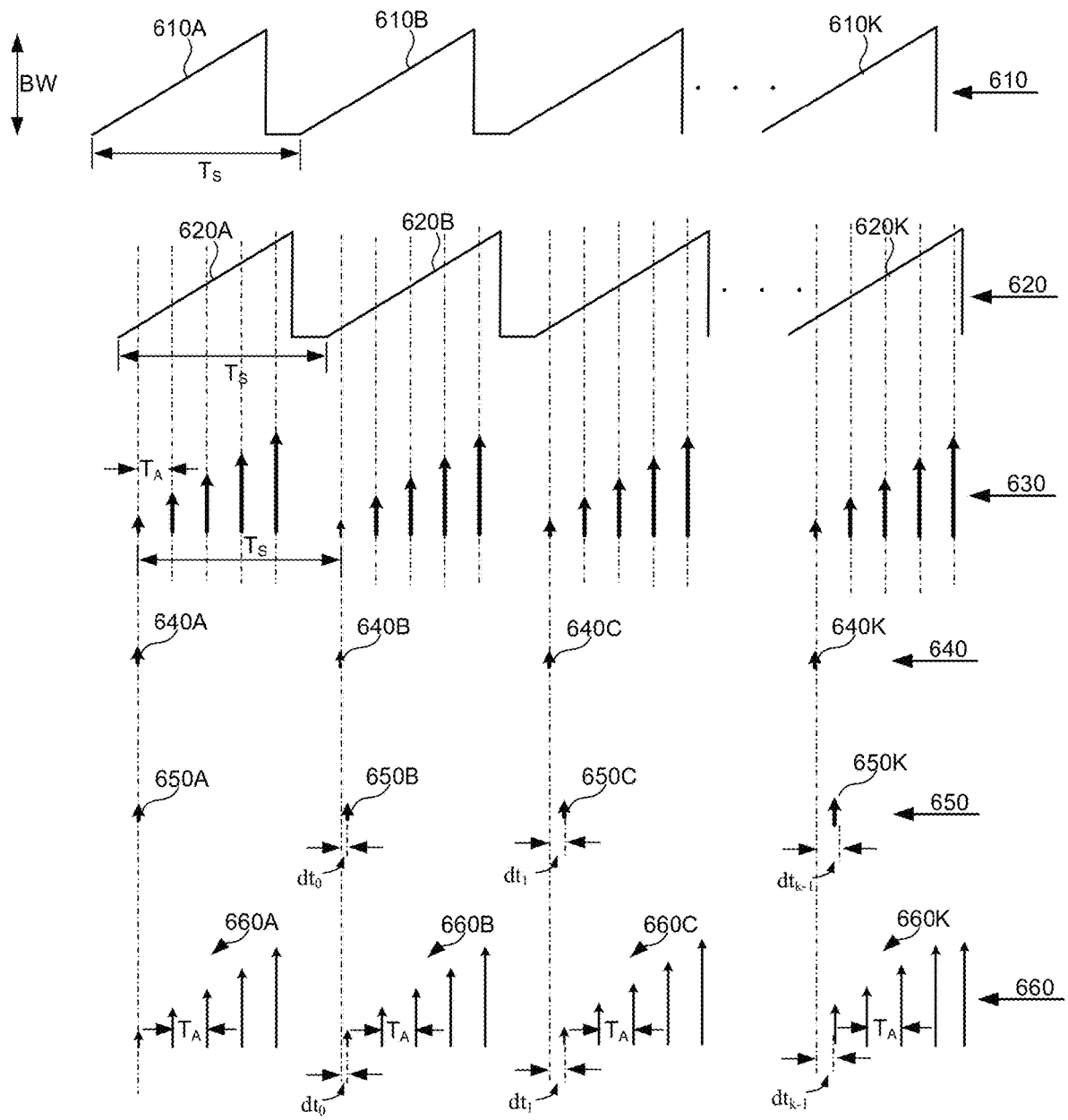

FIG. 6 illustrates the non-uniform Doppler sampling in an embodiment.

Figure 1A:
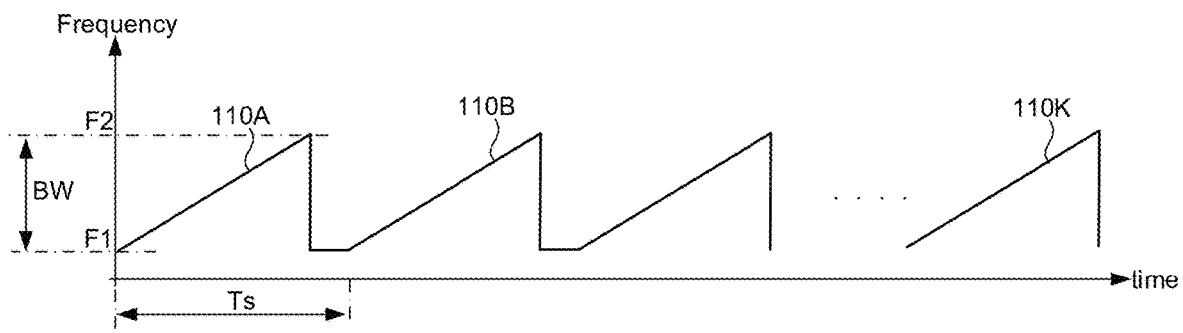
FIG. 1A illustrates an example sequence of chirps transmitted (and ideally received) for determining the range and Doppler velocity.
Figure 1B:
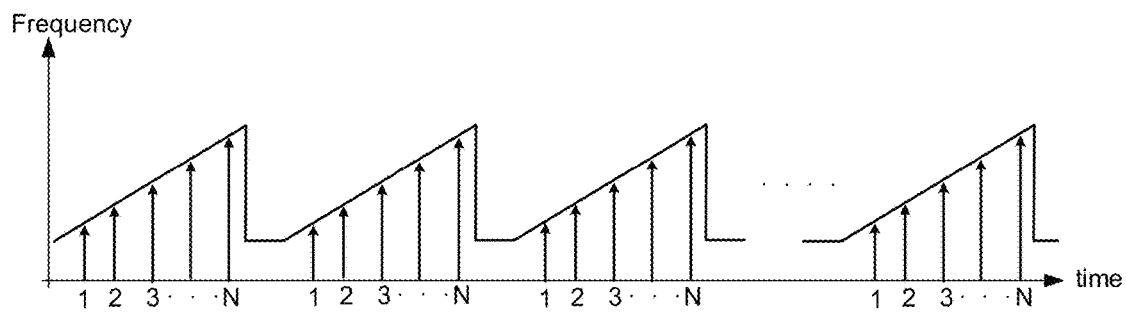
FIG. 1B illustrates an example sampling of the received chirps.
Figure 3:
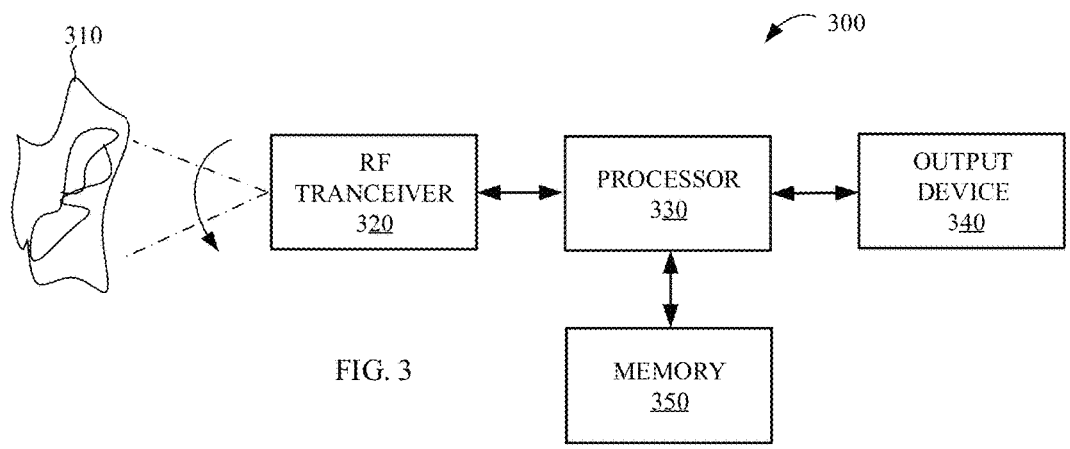
FIG. 3 is a block diagram of an example system 300 (environment) in which various aspects of the present invention may be seen.
Figure 2:
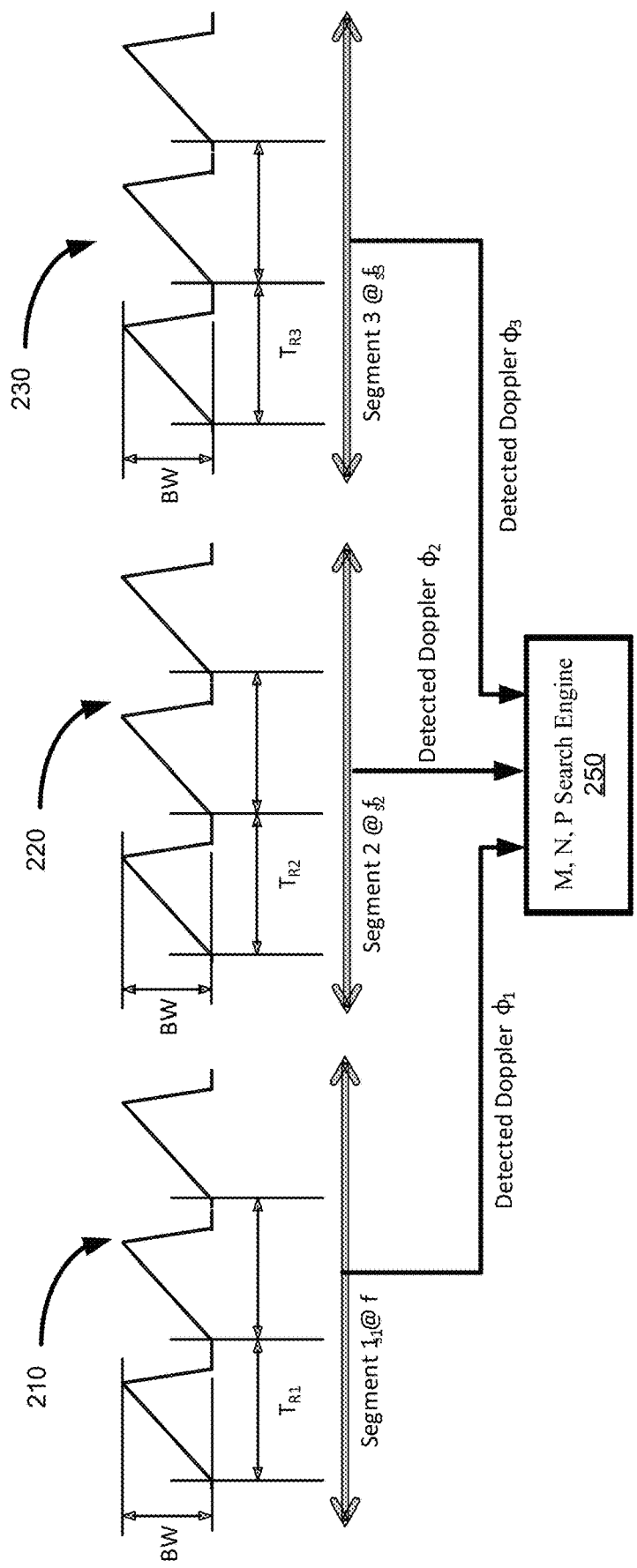
FIG. 2 is one known technique for extension of Doppler range.
Figure 7:
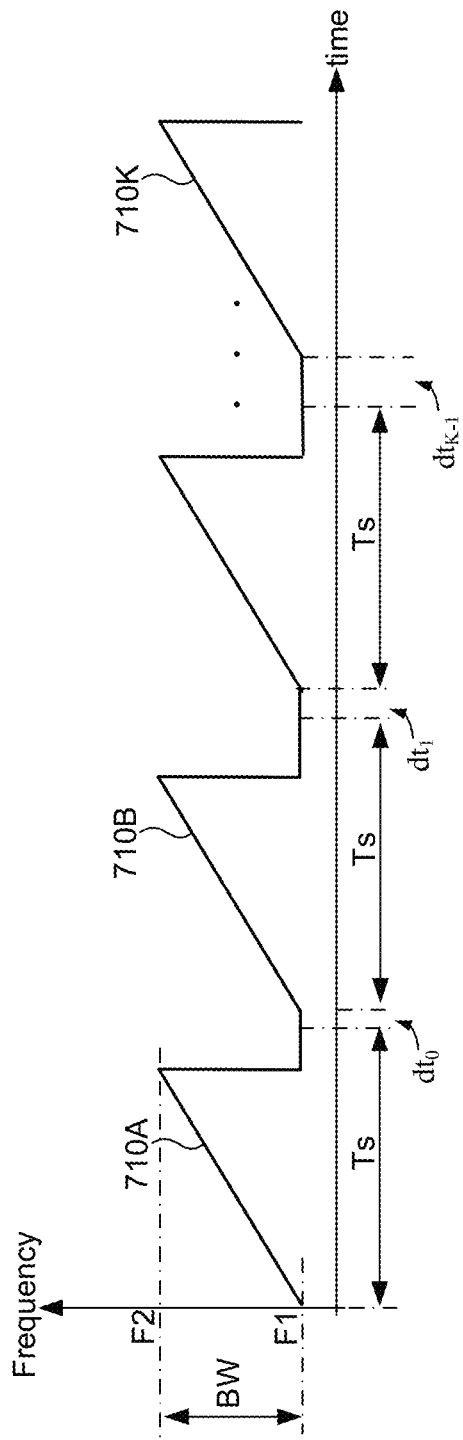

The FIG. 7 illustrates an example transmit signal transmitted by the transmitter 415. DETAILED DESCRIPTION OF THE PREFERRED EXAMPLES FIG. 3 is a block diagram of an example system 300 (environment) in which various aspects of the present invention may be seen. The environment is shown comprising objects 310, Radio Frequency (RF) transceiver 320, processor 330, output device 340 and memory 350. Each element in the system 300 is further described below.

RF transceiver 320 transmits a radar (RF) signal over a desired direction(s) and receives a reflected radar signal that is reflected by the object 310. In one embodiment, the RF transceiver 320 may employ multiple (one or more) receiving antennas to receive the reflected RF signal and multiple (one or more) transmitting antenna for transmitting the radar signal. Accordingly, the transceiver 320 may employ these multiple transmitting/receiving antennas in several of multiple input and multiple output (MIMO) configurations to form desired transmitting and receiving RF signal beam (often referred to as Beam forming) to detect objects from the reflected signal. The objects 310 may comprise a terrain, terrain projections, single object, cluster of objects, multiple disconnected objects, stationary object, moving object, live objects etc.

Processor 330 conditions and processes the received reflected RF signal to detect one or more objects (for example 310) and determines one or more properties of the objects. The properties of the object thus determined (like shape, size, relative distance, relative velocity, location, azimuth and/or elevation angels etc.) are provided to the output device 340. In an embodiment, the processor 330 comprises signal conditioner to perform signal conditioning operations and provides the conditioned RF signal for digital processing. The memory 150 may store RF signal like samples of the reflected RF signal for processing. The processor 330 may temporarily store received data, signal samples, intermediate data, results of mathematical operations, etc., in the memory 350 (such as buffers, registers). In an embodiment, processor 330 may comprise group of signal processing blocks each performing the specific operations on the received signal and together operative to detect object and its characteristics/properties.

The output device 340 comprises navigation control electronics, display device, decision making electronic circuitry and other controllers respectively for navigation, display and further processing the received details of the object. Accordingly, the system 300 may be deployed as part of unmanned vehicles, driver assistant systems for example for obstacle detection, navigation and control and for terrain mapping.

In an embodiment, the RF transceiver 320, processor 330, and memory 350 are implemented as part of an integrated circuit (chips) integrated with other functionality and/or as a single chip integrated circuit with interfaces for external connectivity like the output device 340. The manner in which the transceiver 320 and the processor 330 (together referred to as Radar transceiver) may be implemented in an embodiment is further described below.

Figure 4:
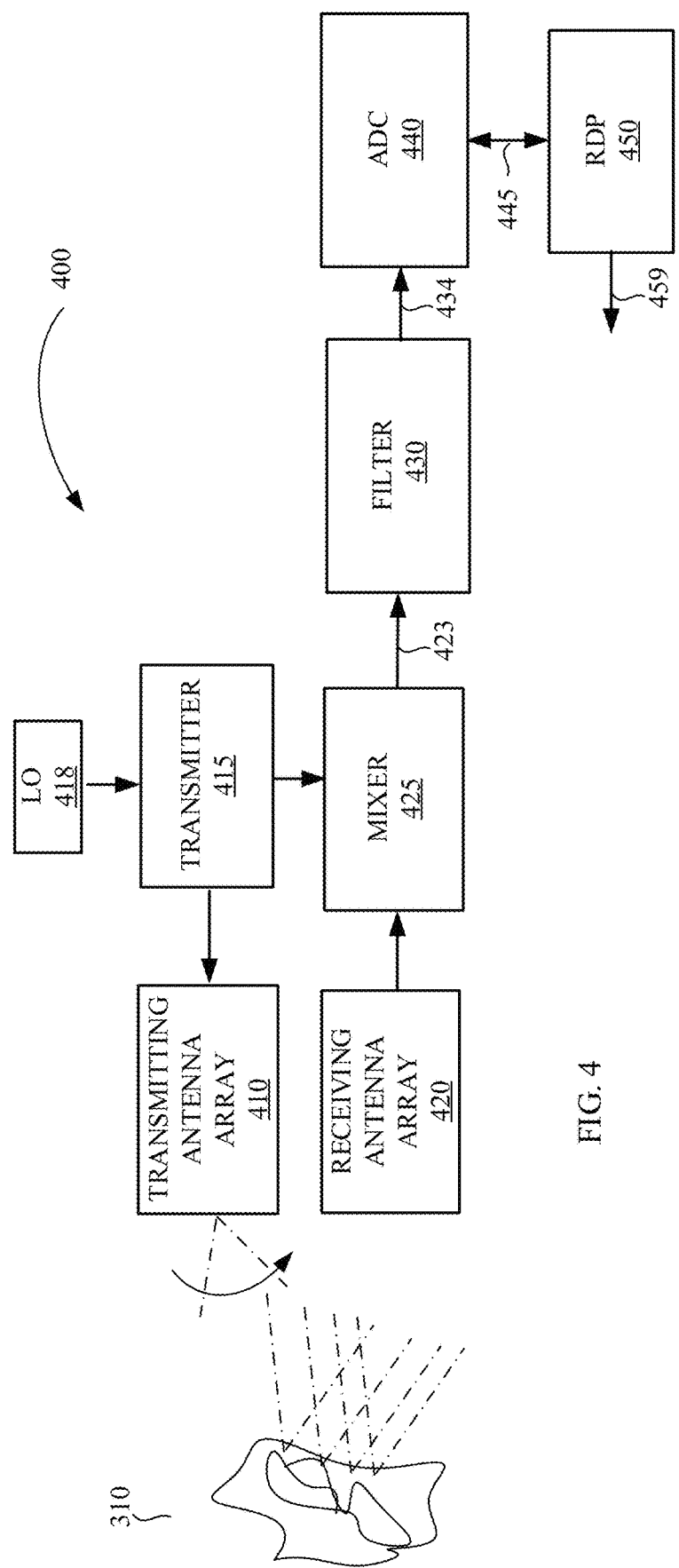
FIG. 4 is an example Radar transceiver for object detection and recognition in an embodiment.

FIG. 4 is an example Radar transceiver for object detection and recognition in an embodiment. The Radar transceiver 400 is shown comprising transmitting antenna 410, transmitter block 415, local oscillator 418, receiving antenna array 420, mixer 425, filter 430, analog to digital convertor (ADC) 440 and Range Doppler and Position extractor (RDP) 450. Each element is described in further detail below.

The transmitting antenna array 410 and the transmitter 415 operate in conjunction to transmit RF signal. The antenna elements in the transmitting antenna array may be arranged in one dimension or two dimensional arrays. Local oscillator (LO) 418 generates modulated signal/radar signal (for example chirps) and provides the same to the transmitter 415 and mixer 425. The transmitter 415 arranges/selects the transmitting antennas for transmitting the radar signal and provides the same to the transmitting antenna array for transmission. The transmitting antenna array 410 is employed to form number of transmitting channels. In one embodiment, the transmitting antenna array may also be employed to form a transmit beam with an antenna aperture to illuminate objects at suitable angle. The receiving antenna array 420 receives reflected RF signal. The receiving antenna elements may be arranged in one or two dimensional array. The RF signal received on each element is provided to the mixer 425.

The Mixer 425 mixes RF signal received on receiving antenna array 420 with the local oscillator 418 generated radar signal to generate an intermediate frequency signal (IF signal/base band signal). In that the mixer 425 may comprise number of mixers to mix each RF signal received on the corresponding antenna elements. The intermediate frequency signal is provided on path 423 to filter 430. The filter 430 passes the IF signal attenuating the frequency components outside the band of interest (such as various harmonics) received from the mixer. The filter 430 may be implemented as a band pass filter to pass a desired bandwidth (in conjunction with chirp bandwidth BW).

The ADC 440 converts IF signal received on path 434 (analog IF signal) to digital IF signals. The ADC 440 may sample the analog IF signal at a sampling frequency Fadc and convert each sample value to a bit sequence or binary value. The digitised samples of IF signal (digital IF signal) is provided for further processing on path 445 to RDP 450.

The Range Doppler and Position extractor (RDP) 450 is configured to extract the range, Doppler (the velocity/relative velocity) and the position (azimuth and/or elevation) of the object from the samples received on the path 445. In one embodiment, the RDP 450 provides an enhanced Doppler range and resolution on path 459. The manner in which the RDP 450 may be implemented in an embodiment is further described below.

Figure 5A:
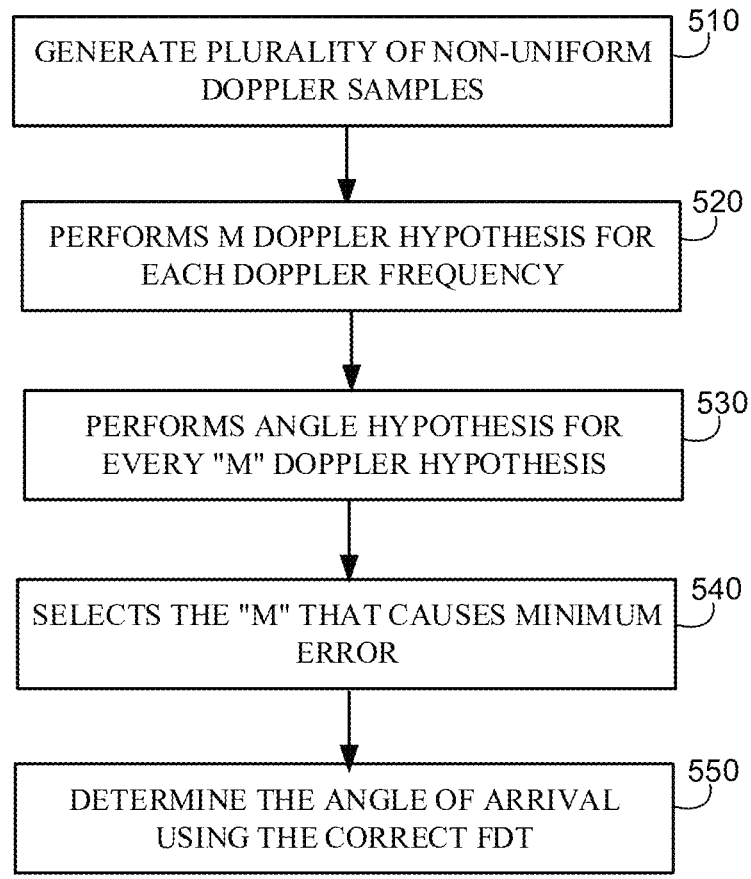
FIG. 5A is block diagram illustrating determination of Doppler in an embodiment.
Figure 5B:
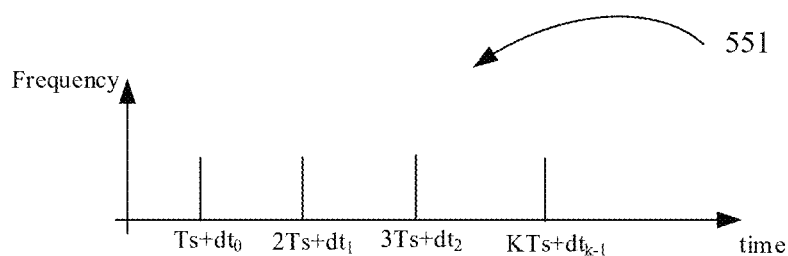
FIG. 5B is a graph illustrating the non-uniformly sampled Doppler in an embodiment.

FIG. 5A is block diagram illustrating determination of Doppler in an embodiment. In block 510, the RDP 450 generates plurality of non-uniformly sampled in time Doppler samples across a set of K chirps received. FIG. 5B is a graph illustrating the non-uniformly sampled Doppler in an embodiment. The non-uniform samples 551 are shown comprising K non-uniform Doppler samples sampled in time. The K non-uniform samples are shown at time instances $Ts+dt_0$, $2Ts+dt_1$, $3Ts+dt_2$, through $KTs+dt_{k-1}$. That is, each deviation $dt_0$, $dt_1$, $dt_2$ ... $dt_{k-1}$ are not same and/or selected with different values. The RDP 450 may generate the Doppler samples ($f_{d1}$, $f_{d2}$ ... $f_{dk}$) at corresponding sampling time instances $Ts+dt_0$, $2Ts+dt_1$, $3Ts+dt_2$, through $KTs+dt_{k-1}$.

Figure 5C:
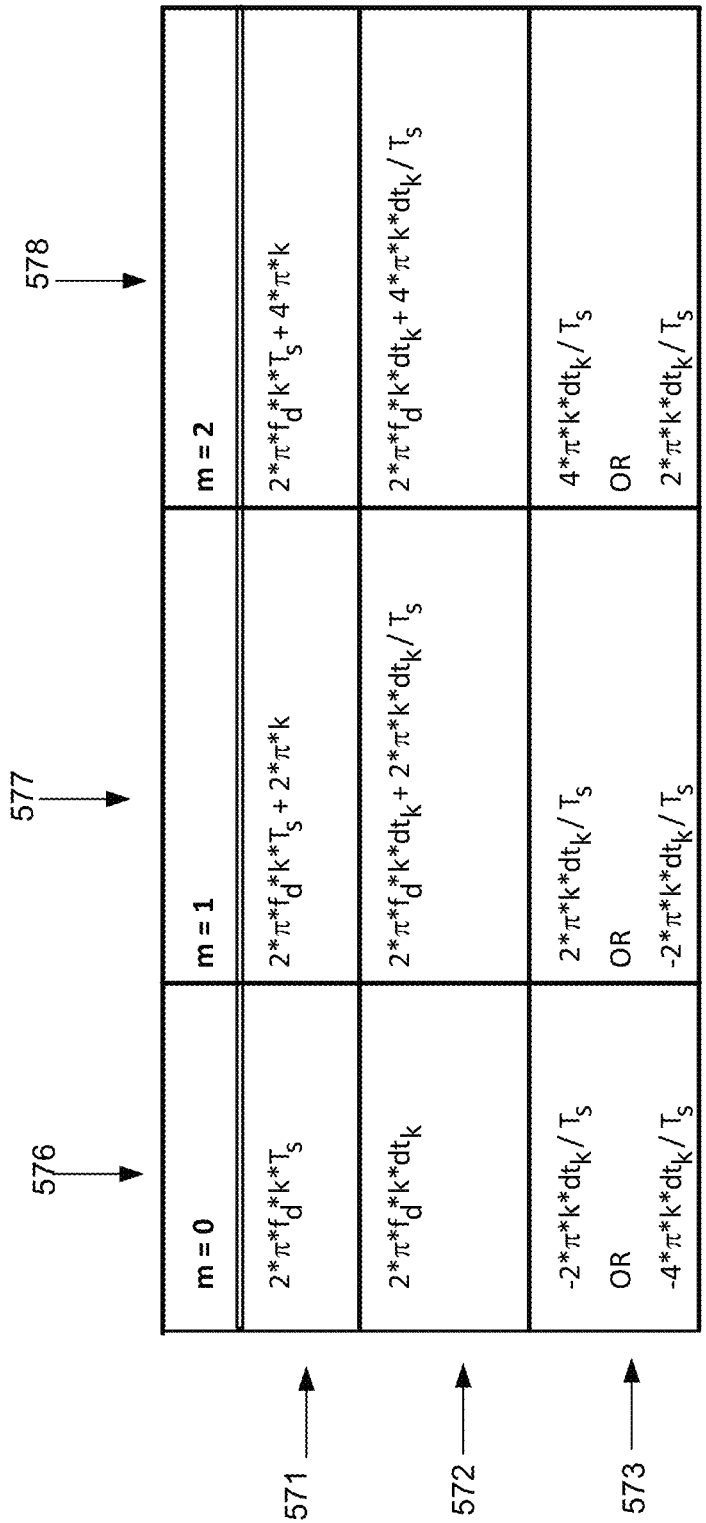
FIG. 5C is table illustrating the phase and/or phase error due to non-uniform sampling.

In block 520, the RDP 450 performs M Doppler hypothesis for each Doppler frequency. As may be appreciated, when a Doppler ($f_D$) is measured, the true Doppler ($f_{DTrue}$) can be $f_{DT}=f_d+m*f_s$ where m= ... −1, 0, +1, +2, ... M, by the principle of aliasing. Thus, each Doppler sample $f_{dk}$ may represent the real doppler ($f_d$) or aliased doppler $f_{DT}=f_d+m*f_s$, wherein $f_s$ being average doppler sampling frequency, m taking value m=0, +/−1, ... +/−M. In one embodiment, the RDP 450 may determine the for different value of "m". In that value of M may be selected based on the expected or desired maximum velocity of the object to be detected. The hypothesis $f_{DT}=f_d+m*f_s$ for different value of m may introduce different phase error due to non-uniform sampling. FIG. 5C is table illustrating the phase and/or phase error due to non-uniform sampling. In the FIG. 5C, the row 571 represents phase due to doppler for k=0, 1, 2, .... K−1 for uniform doppler sampling, row 572 represents additional phase deviation due to non-uniform sampling for kth doppler sample, and row 573 represents phase error for incorrect doppler hypothesis for kth sample for "m" value of 0, 1, and 2 respectively as in the columns 576, 577, and 578. As may be seen RDP 450 may generate Doppler hypothesis for each value of m. That is, m=0 may represent a case of no aliasing, m=1 may represent a case when the aliasing is by 2π, m=2 may represent a case when the aliasing is by 4× so on. As illustrated there in, for a given Doppler frequency sample, selection of a correct m value, the hypothesis results with the correct phase (as in row 571) and the phase error component cancels out, and for incorrect m value, the phases error (as in row 572) persists at the output of the block 520.

Figure 5D:
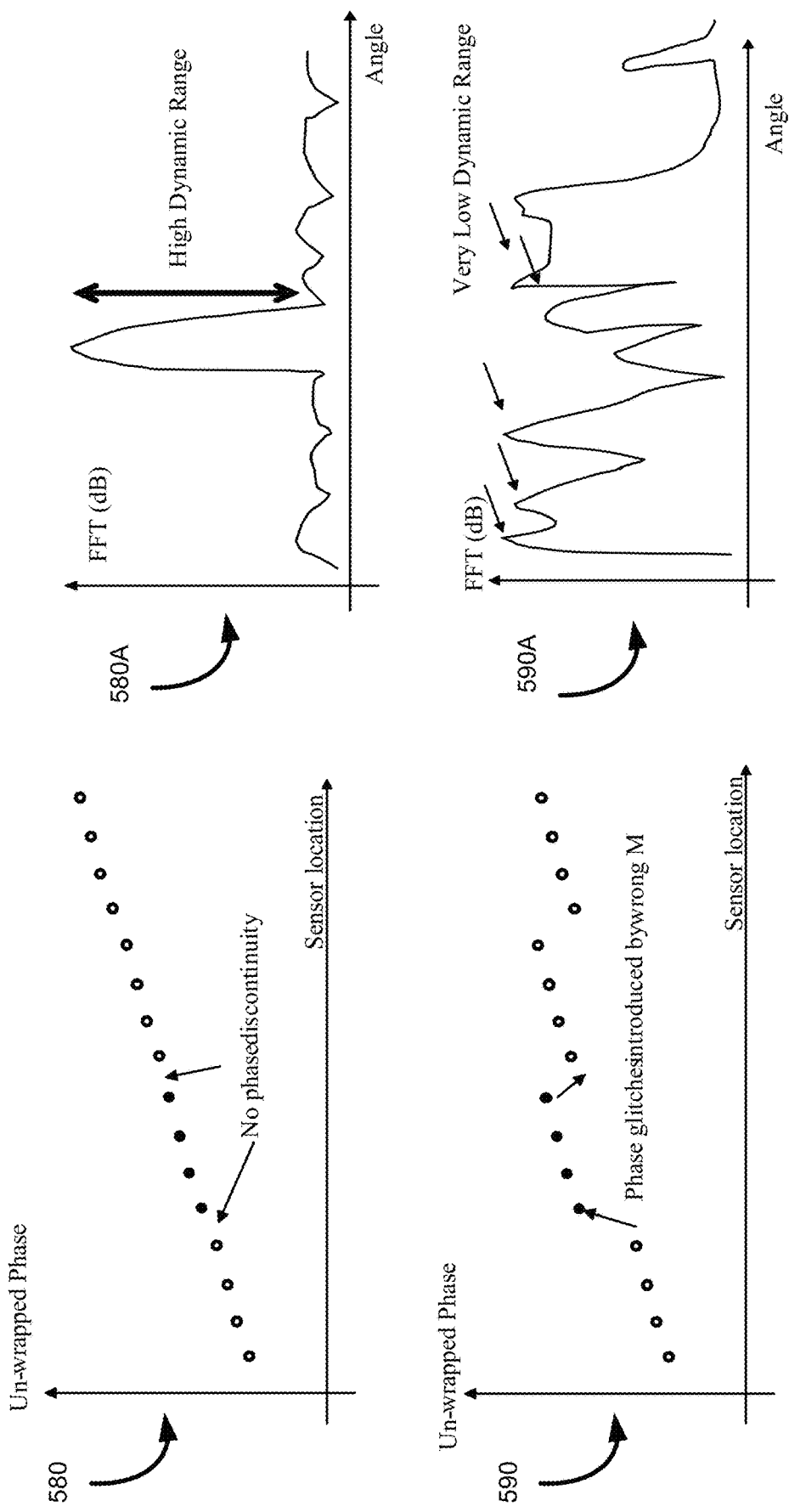
FIG. 5D illustrates the phase error due to the wrong selection of m.

In block 530, RDP 450 performs angle hypothesis for every "m" Doppler hypothesis. In one embodiment the RDP 450 may perform angle of arrival employing the chirps (signal received) received over multiple receiving antennas. As an alternative, the RDP 450 may adopt any known techniques to determine the angle of arrival. Techniques and signal processing adopted to determine the angle of arrival is generally referred to as the angle hypothesis herein. In one embodiment, the sampling deviations ($dt_0$, $dt_1$, $dt_2$ ... $dt_{k-1}$) are specifically arrived at to create maximum error at the output of angle of arrival hypothesis for an incorrect choice of m. Thus, the block 530 provides an angle of arrival with an error component due to the $dt_0$, $dt_1$, $dt_2$ ... $dt_{k-1}$. FIG. 5D illustrates the phase error due to the wrong selection of m. In the graph 580 and 590, the X-axis represents the position of the receiving antenna element in distance and Y-Axis representing the measured phase per antenna. As shown there, the graph 580 illustrates condition when correct m us used, no non-uniformity is introduced. The graph 590 illustrates the phase glitch introduced when the m selected is incorrect. Graph 580A and 590A respectively illustrates the frequency spectrum of the graph 580 and 590 when a Fast Fourier Transformation (FFT) is performed across the antenna array.

Figure 5E:
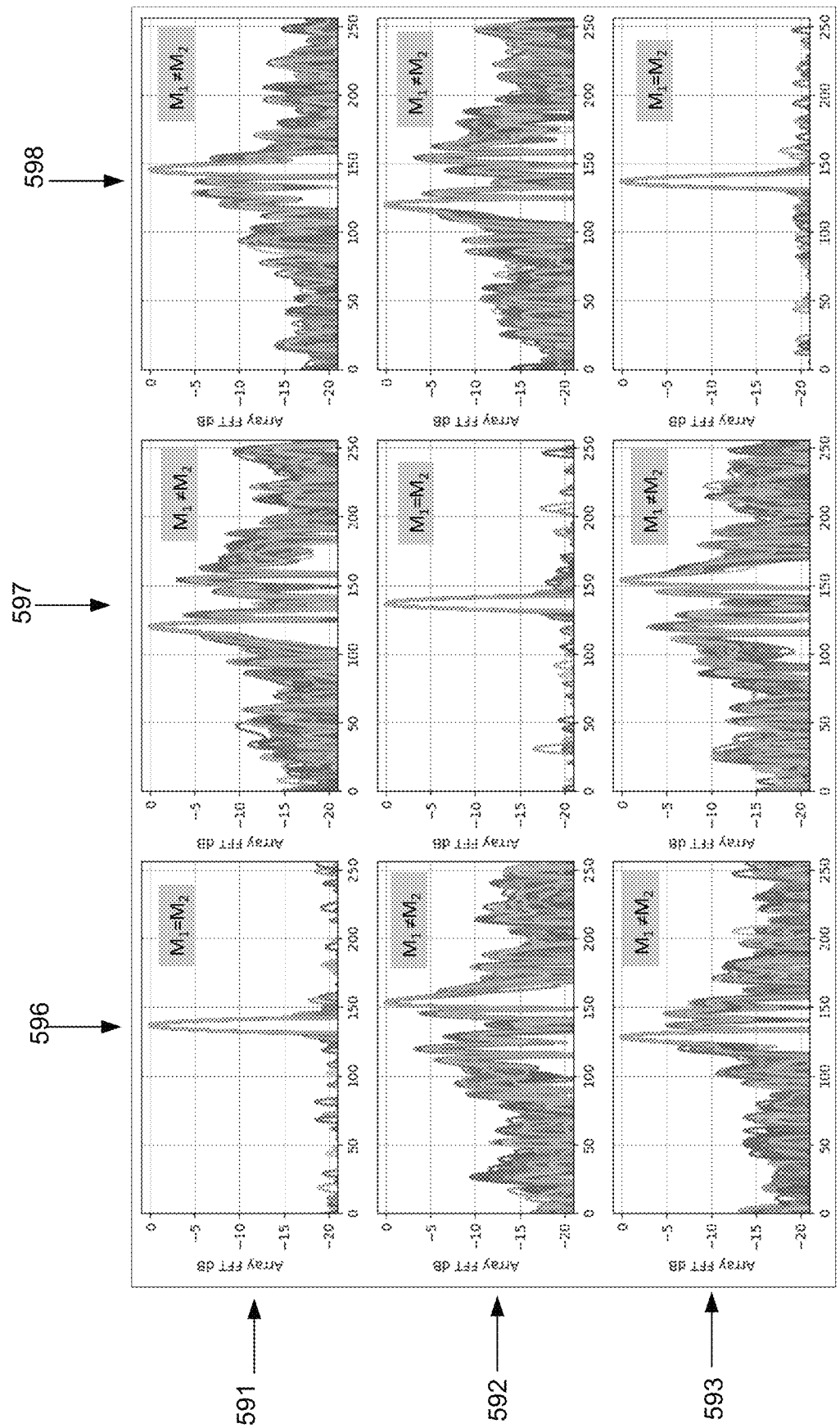

In block 540, the RDP 450 selects the "m" that causes minimum error at the output of the block 530. In one embodiment, the RDP 450 uses/employs an objective function to measure the error at the output of the angle of arrival hypothesis. The choice of m that minimizes the objective function is determined as the correct hypothesis and used for computing the $f_{DT}$. FIG. 5E illustrates spectrum as an example measure of error determined by the RDP 450. In the FIG. 5E, row 591, 592, and 593 represent the doppler for and columns 596, 597 and 598 represents the spectrum corresponding different value of "m". As may be seen the fai exhibits minimum error (noise) for m=M1 (say m=0), $f_{d2}$ exhibits minimum error for m=M2 (say m=1) and $f_{d3}$ exhibits minimum for m=M3 (say m=2). Thus, $f_{d1}$ is computed as $f_{d1}=f_d+0*f_s$, $f_{d2}$ is computed as $f_{d2}=f_d+1*f_s$, and $f_{d3}$ is computed as $f_{d3}=f_d+2*f_s$. As a result, the ambiguity due to the aliasing is eliminated and the resolution may be enhanced without incurring the (aliasing limitation) ambiguity issue.

In block 550, the RDP 450 determines the angle of arrival using the correct far. For example, the Dopplers as determined in the block 540 are provided for determining the angle of arrival. The RDP 450 may perform the FFT across the antenna array (plurality of antennas) on the corrected Doppler frequency. The manner in which the RDP 450 may generate non-uniform Doppler sample in an embodiment is further described below.

FIG. 6 illustrates the non-uniform Doppler sampling in an embodiment. In the FIG. 6, the graph 610 illustrates an example transmitted signal (similar to the 110, reproduced here for reference). The transmitted signal 610 is shown comprising K chirps 610A-610K with chirp period Ts and chirp bandwidth BW. The curve 620 illustrates the received signal. The received signal 620 is shown comprising chirps 620A-620K corresponding to the transmitted chirps 610A-620K. The samples 630 represent the uniform samples of the received signal. The uniform samples 630 are shown sampled at the time interval TA (between the two successive samples) within each received chirp 620A-620K. In that TA may be selected based on the BW meeting the Nyquist Criteria. The uniform samples 630 may be employed for determining the range. The range may be determined using set of samples 630 within each received chirp 620A-620K.

The samples 640 represent uniform Doppler samples. As may be seen the samples 640 comprises samples 640A-640K sampled across the chirps at uniform sampling interval of Ts. The uniform samples 640A-640K may be used to determine the Doppler that may be aliased. For example the samples 640 may be subjected to FFT for determining the Doppler frequencies (the peaks in FFT spectrum may represent the Doppler frequencies, for example). The samples 650 represent non-uniform Doppler samples. As may be seen the samples 650 comprises samples 650A-650K sampled across the chirps at successive a non-uniform sampling interval of $T_s$, $T_s+dt_0$, $T_s+dt_1$ .... $T_s+dt_{K-1}$. The samples 650 represents one set of samples with one sample per chirp across K chirps. Similarly, more than one set of samples may be generated across the chirps. The graph 660 represents multiple set of non-uniform Doppler samples. As may be seen that the samples of each set 660A, 660B, ... 660K maintain non-uniform time interval among the samples. That is, first sample in each set 660A, 660B, ... 660K is non uniform across the chirps, second sample in each set 660A, 660B, ... 660K is non uniform across the chirps so on and so forth.

In one embodiment, such non-uniformity in sampling is achieved by configuring the transmitter to transmit the sequence of chirp signal at non-uniform time. The FIG. 7 illustrates an example transmit signal transmitted by the transmitter 415. As shown there, the chirp 710A-710K are transmitted at non-uniform interval. That is, the chirp 710A-710K are maintained with time period $T_s$ (that is total time period Ts as in 110). However, the chirp 710B is transmitted after a delay of $dt_0$ from end of chirp 710A; 710C is transmitted after a further delay $dt_1$ from end of chirp 710B, so on and so forth. Due to the transmission of the signal 700, a non-uniform received Doppler samples similar to 640 or 650 (may be with $T_s-dt_0$, $T_s-dt_1$ ... ) is generated. Thus, non-uniform doppler samples may be generated either transmitting the signal 700 and/or configuring the Analog to digital convertor (ADC) 440 in the receiver to sample at a non-uniform time period (by way of offsetting the period, for example).

In one embodiment, the uniform sample 630 may be employed for the generating first set of Doppler frequencies. The first set of Doppler Frequencies may be used as reference in selecting the frequencies when the non-uniform samples 640/650/660 are employed for generating the non-aliased Doppler frequencies.

While various examples of the present disclosure have been described above, it should be understood that they have been presented by way of example, and not limitation. Thus, the breadth and scope of the present disclosure should not be limited by any of the above described examples, but should be defined in accordance with the following claims and their equivalents.

What is claimed is:

1. A method of determining Doppler in a radar system comprising:
   receiving a set of chirps;
   sampling in time the set of chirps to generate a set of samples that are non-uniform in time in each chirp across the set of chirps;
   generating a first Doppler frequency from the set of non-uniform samples;
   generating a set of non-aliased Doppler frequencies of the first Doppler frequency by correspondingly applying a set of hypotheses;
   determining a set of angles of arrival for every non-aliased Doppler frequency in the set of non-aliased Doppler frequencies;
   determining an error in each angle of arrival in the set of angles of arrival; and
   selecting a first non-aliased Doppler frequency in the set of non-aliased Doppler frequencies that corresponds to an angle of arrival having a minimum error in the set of angles of arrival.

2. The method of claim 1, wherein the set of non-uniform samples are sampled at time instances $Ts+dt_0$, $2Ts+dt_1$, $3Ts+dt_2$, through $KTs+dt_{k-1}$ when the set of chirps comprises K chirps with a uniform time period Ts.

3. The method of claim 2, wherein the set of non-aliased Doppler frequencies are $f_{d1}, f_{d2}, \ldots f_{dM}$, the first doppler frequency is fa and the set of hypotheses are $f_{dm}=f_d+m*(1/T_s)$, where m is an integer value from −M to +M.

4. The method of claim 3, further comprising determining a second angle of arrival from the first non-aliased Doppler frequency.

5. The method of claim 1, wherein the set of chirps comprises K chirps with a non-uniform time period Ts, $T_s+dt_0$, $Ts+dt_1 \ldots T_s+dt_{k-2}$ and each chirp has a bandwidth BW and the same slope.

* * * * *